(12) United States Patent
Soryal

(10) Patent No.: US 12,241,980 B2
(45) Date of Patent: Mar. 4, 2025

(54) DETECTING A REFLECTIVE SURFACE TO REFLECT A SIGNAL FROM ACCESS POINT EQUIPMENT TO SIGNAL RECEIVING EQUIPMENT

(71) Applicant: AT&T Intellectual Property I, L.P., Atlanta, GA (US)

(72) Inventor: Joseph Soryal, Glendale, NY (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 380 days.

(21) Appl. No.: 17/809,429

(22) Filed: Jun. 28, 2022

(65) Prior Publication Data
US 2023/0417911 A1    Dec. 28, 2023

(51) Int. Cl.
*G01S 17/48* (2006.01)
*G01S 17/89* (2020.01)
*H04W 24/02* (2009.01)

(52) U.S. Cl.
CPC .............. *G01S 17/48* (2013.01); *G01S 17/89* (2013.01); *H04W 24/02* (2013.01)

(58) Field of Classification Search
CPC ..... H04W 64/00; H04W 16/28; H04W 24/10; H04W 64/003; H04W 92/18; H04W 72/0453; H04W 16/22; H04W 64/006; H04W 16/02; H04W 4/029; H04W 72/04; H04W 72/12; H04W 72/51; H04W 4/40; H04W 4/46; H04W 72/23; H04W 16/18; H04W 16/32; H04W 4/06; H04W 72/046; H04B 7/0695; H04B 7/04013; H04B 7/0617; H04B 7/10; H04B 17/0087; H04B 17/309; H04B 17/3912; H04B 7/043; H04B 17/373; H04B 7/0408; H04B 17/27; H04B 17/318; H04B 7/024; H04B 17/23; H04B 17/336; H04B 17/391; H04B 7/0404; H04B 7/06952; H04B 7/088; G01S 5/0273;
(Continued)

(56) References Cited

U.S. PATENT DOCUMENTS

2014/0146741 A1* 5/2014 Azancot ................. H04W 84/12
370/315
2022/0228863 A1* 7/2022 Kee .......................... G01S 17/08
(Continued)

FOREIGN PATENT DOCUMENTS

WO    WO-2022057918 A1 *  3/2022    ........... H01Q 15/002

*Primary Examiner* — Golam Sorowar
(74) *Attorney, Agent, or Firm* — Guntin & Gust, PLC; Miyoung Shin

(57) ABSTRACT

The technologies described herein are generally directed to detecting reflective surfaces for use reflecting a signal from access point equipment to destination equipment in advanced networks, e.g., at least a fifth generation (5G) network. For example, a method described herein can include receiving from access point equipment, characteristic data representative of a characteristic of a beam of reflected light reflected by a reflective surface and detected by the access point equipment. The method can further include, based on the characteristic and a first geographic location of the access point equipment, mapping a second geographic location of the reflective surface. Further, the method can include, storing location information corresponding to the second geographic location of the reflective surface, resulting in a stored surface location.

20 Claims, 11 Drawing Sheets

(58) Field of Classification Search
CPC .... G01S 5/0236; G01S 13/765; G01S 5/0036; G01S 7/006; G01S 5/0072; G01S 5/10; G01S 13/003; G01S 13/878; G01S 5/02521; G01S 13/876; G01S 19/51; G01S 5/0045; G01S 5/0284; G01S 5/04; G01S 5/06; G01S 5/08; G01S 13/46; G01S 2013/462; G01S 2013/464
See application file for complete search history.

(56) References Cited

U.S. PATENT DOCUMENTS

| | | | |
|---|---|---|---|
| 2023/0379867 A1* | 11/2023 | Gummadi | H04W 64/003 |
| 2024/0162940 A1* | 5/2024 | Ren | H04L 25/0204 |
| 2024/0185434 A1* | 6/2024 | Wyffels | G06V 20/58 |

* cited by examiner

DETECTING A REFLECTIVE SURFACE TO REFLECT A SIGNAL FROM ACCESS POINT EQUIPMENT TO SIGNAL RECEIVING EQUIPMENT

TECHNICAL FIELD

The subject application is related to different approaches to handling communication in networked computer systems and, for example, to using reflective surfaces to improve signal propagation.

BACKGROUND

As demands for fast, high-quality wide area network connections have increased, wireless providers have implemented many new technologies, each having advantages and drawbacks over traditional approaches. New, shorter wavelength frequency bands can provide dramatically faster broadband connections to mobile devices, but because these bands can be blocked easier and have narrower beams, positioning them to offer service to user devices in a variety of different locations has been challenging.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
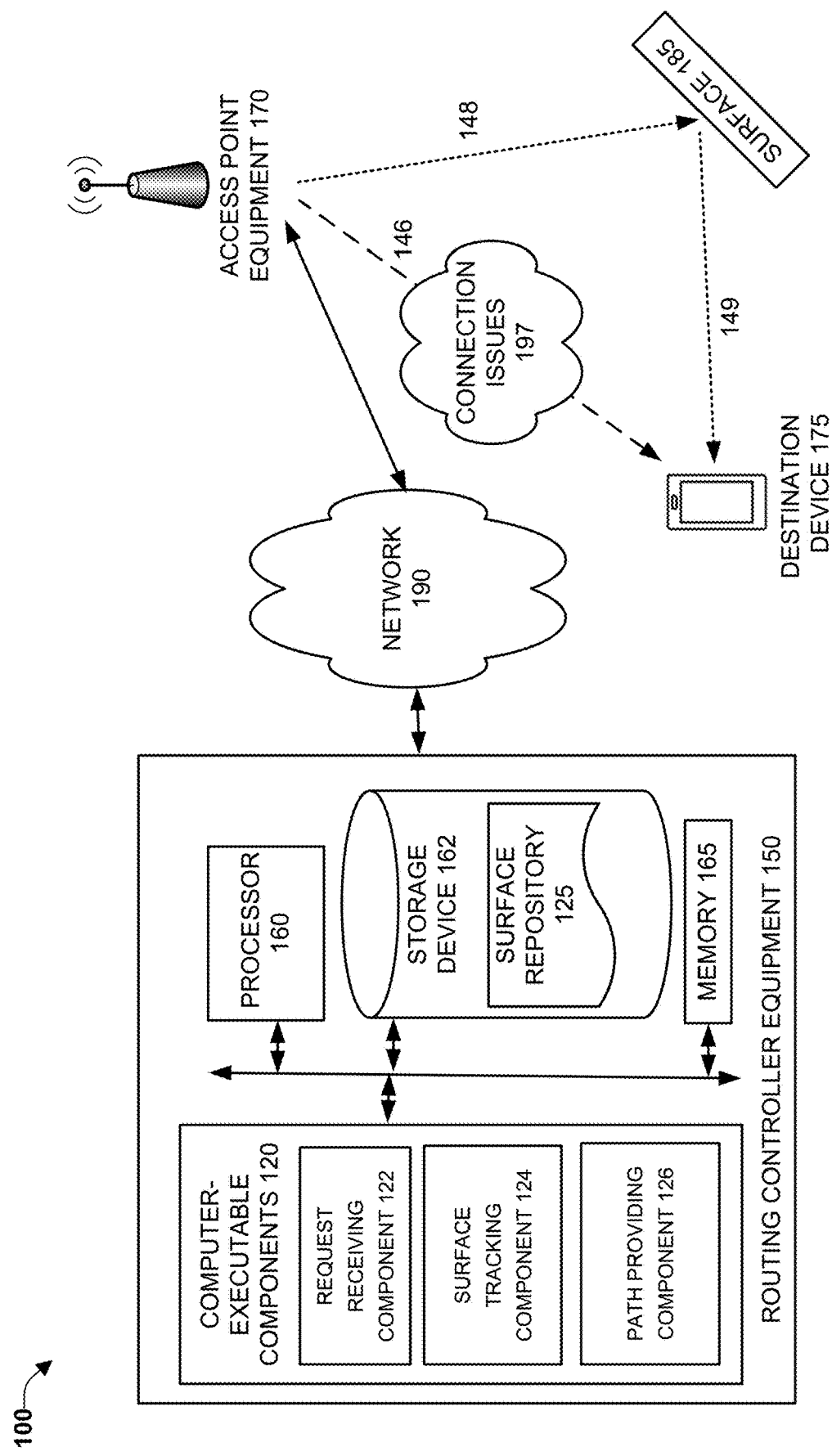
FIG. 1 is an architecture diagram of an example system that can facilitate detecting reflective surfaces for use reflecting a signal from access point equipment to destination equipment, in accordance with one or more embodiments.

Generally speaking, one or more embodiments of a system described herein can facilitate detecting reflective surfaces for use reflecting a signal from access point equipment to destination equipment. In addition, one or more embodiments described herein can be directed towards a multi-connectivity framework that supports the operation of new radio (NR, sometimes referred to as 5G). As will be understood, one or more embodiments can improve network connectivity, by supporting control and mobility functionality on cellular links (e.g., long term evolution (LTE) or NR). One or more embodiments can provide benefits including, system robustness, reduced overhead, and global resource management.

It should be understood that any of the examples and terms used herein are non-limiting. For instance, while examples are generally directed to non-standalone operation where the NR backhaul links are operating on millimeter wave (mmWave) bands and the control plane links are operating on sub-6 GHz long term evolution (LTE) bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

In some embodiments, understandable variations of the non-limiting terms "signal propagation source equipment" or simply "propagation equipment," "radio network node" or simply "network node," "radio network device," "network device," and access elements are used herein. These terms may be used interchangeably and refer to any type of network node that can serve user equipment and/or be connected to other network node or network element or any radio node from where user equipment can receive a signal. Examples of radio network node include, but are not limited to, base stations (BS), multi-standard radio (MSR) nodes such as MSR BS, gNode B (gNB), eNode B (eNB), network controllers, radio network controllers (RNC), base station controllers (BSC), relay, donor node controlling relay, base transceiver stations (BTS), access points (AP), transmission points, transmission nodes, remote radio units (RRU) (also termed radio units herein), remote ratio heads (RRH), and nodes in distributed antenna system (DAS). Additional types of nodes are also discussed with embodiments below, e.g., donor node equipment and relay node equipment, an example use of these being in a network with an integrated access backhaul network topology.

In some embodiments, understandable variations of the non-limiting term user equipment (UE) are used. This term can refer to any type of wireless device that can communicate with a radio network node in a cellular or mobile communication system. Examples of UEs include, but are not limited to, a target device, device to device (D2D) user equipment, machine type user equipment, user equipment capable of machine to machine (M2M) communication, PDAs, tablets, mobile terminals, smart phones, laptop embedded equipped (LEE), laptop mounted equipment (LME), USB dongles, and other equipment that can have similar connectivity. Example UEs are described further with FIGS. 10 and 11 below. Some embodiments are described in particular for 5G new radio (NR) systems. The embodiments are however applicable to any radio access technology (RAT) or multi-RAT system where the UEs operate using multiple carriers, e.g., LTE. Some embodiments are described in particular for 5G new radio systems. The embodiments are however applicable to any RAT or multi-RAT system where the UEs operate using multiple carriers, e.g., LTE.

One having skill in the relevant art(s), given the disclosure herein, understands that the computer processing systems, computer-implemented methods, equipment (apparatus) and/or computer program products described herein employ hardware and/or software to solve problems that are highly technical in nature (e.g., rapidly and dynamically utilizing mapped reflective surfaces to direct communication beams), that are not abstract and cannot be performed as a set of mental acts by a human. For example, a human, or even a plurality of humans, cannot efficiently manage the complex reflected paths (which generally cannot be performed manually by a human) with the same level of accuracy and/or efficiency as the various embodiments described herein.

Aspects of the subject disclosure will now be described more fully hereinafter with reference to the accompanying drawings in which example components, graphs and selected operations are shown. In the following description, for purposes of explanation, numerous specific details are set forth in order to provide a thorough understanding of the various embodiments. For example, some embodiments described can facilitate detecting reflective surfaces for use reflecting a signal from access point equipment to destination equipment. Different examples that describe these aspects are included with the description of FIGS. 1-10 below. It should be noted that the subject disclosure may be embodied in many different forms and should not be construed as limited to this example or other examples set forth herein.

FIG. 1 is an architecture diagram of an example system 100 that can facilitate detecting reflective surfaces for use reflecting a signal from access point equipment to destination equipment, in accordance with one or more embodiments. For purposes of brevity, description of like elements and/or processes employed in other embodiments is omitted. As depicted, system 100 includes routing controller equipment 150 communicatively coupled to access point equipment 170 via network 190. Access point equipment 170 has a direct signal path 146 to destination device 175, and also, in accordance with one or more embodiments, communicate indirect signal 148 to be reflected off of surface 185 to become reflected signal 149 received by destination device 175.

With respect to reflected signal 149 (as well as other reflected signals discussed herein), one having skill in the relevant art(s), given the description herein, understands that, as used to describe one or more embodiment herein, a reflected beam can be along a path according to which the beam is relayed by the surface to the user equipment at a first angle corresponding to a second angle at which the second signal strikes the surface. Further to this, it is noted that example signal paths shown in various drawings herewith are approximations meant to be used to illustrate different concepts described herein, and are not meant to show particular reflection angles, distances, and other path characteristics.

Routing controller equipment 150 can include computer-executable components 120, processor 160, storage device 162 and memory 165. Storage device 162 can include surface repository 125. Computer-executable components 120 can include request receiving component 122, surface tracking component 124, path providing component 126, and other components described or suggested by different embodiments described herein, that can improve the operation of system 100.

Generally speaking, as described herein, access point equipment can be provided useful information regarding surface 185 that can facilitate routing a communications signal via reflection from surface 185 for reasons including routing around connection issues 197. It is appreciated that connection issues 197 can include one or more conditions that affect the transmission of communication beams (e.g., radio waves, light beams, sound waves) along direct signal path 146 from access point equipment to destination device 175.

With respect to all signal receiving equipment described herein, it is appreciated that one or more embodiments can be used to provide replacement or additional signals for different types of communication (e.g., for control signals and/or customer communication signals). One having skill in the relevant art(s), given the description herein, understands how one or more embodiments can beneficially provide additional signal streams to destination devices with multiple input capabilities, e.g., as part of multiple input/multiple output (MIMO) capabilities.

One having skill in the relevant art(s), given the descriptions herein, understands that connection issue 197 conditions can include signals congestion, interference, and blockages. In one or more embodiments, connection issues 197 can also broadly include conditions that can detract from signals being communicated to destination device 175 on a priority basis, e.g., when destination device 175 is designated as being used by first responders, additional communication beams can be used to improve one or more aspects of connections therewith. Further to this point, it should be appreciated that one or more embodiments can use reflected signal 149 as a supplement to otherwise unimpeded direct signal path 146, e.g., providing additional communication signals to destination device 175 as a MIMO device.

Thus, in an example, when quality of a communications session with destination device 175 (e.g., via direct signal path 146) is identified as being below a threshold level of quality (e.g., resulting in a low-quality signal), one or more embodiments can request additional paths based on reflected signals from routing controller equipment 150 to provide alternative or additional (e.g., via MIMO capabilities of destination device 175) signals to improve the quality of the communications session.

With respect to the uplink communication capabilities of destination device 175, based on the disclosure herein, it is appreciated that surface repository 125 and surface 185 can also, in one or more embodiments described herein, be used by destination device 175 to communicate uplink signals to access point equipment 170, e.g., to avoid connection issues 197 or to supplement MIMO communications by utilizing both the reverse of direct signal path 146 and the reverse of reflected signal 149. It should be noted that, to facilitate the use of surface 185 for reflection of signals from destination device 175 to access point equipment 170 can utilize capabilities of destination device 175 to transmit signals in a particular direction, e.g., these capabilities being now known or developed in the future.

Continuing the discussion of routing controller equipment 150, it should be appreciated that these components, as well as aspects of the embodiments of the subject disclosure depicted in this figure and various figures disclosed herein, are for illustration only, and as such, the architecture of such embodiments are not limited to the systems, devices, and/or components depicted therein. For example, in some embodiments, routing controller equipment 150 can further comprise various computer and/or computing-based elements described herein with reference to mobile handset 1000 of FIG. 10, and operating environment 1100 of FIG. 11. For example, one or more of the different functions of network equipment can be divided among various equipment, including, but not limited to, including equipment at a central node global control located on the core Network, e.g., mobile edge computing (MEC), self-organized networks (SON), or RAN intelligent controller (RIC) network equipment.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

According to multiple embodiments, storage device 162 can include, but is not limited to, RAM, ROM, EEPROM, flash memory or other memory technology, solid state drive (SSD) or other solid-state storage technology, Compact Disk Read Only Memory (CD ROM), digital video disk (DVD), blu-ray disk, or other optical disk storage, magnetic cassettes, magnetic tape, magnetic disk storage or other magnetic storage devices, or any other medium which can be used to store the desired information and which can be accessed by the computer.

As described further herein, storage device 162 is provided as an example storage component for storage of surface information (e.g., for surface 185) including but not limited to, one or more of, the geographic location of surface 185, the absolute orientation (e.g., heading) of surface 185, the relative location of surface 185 relative to access point equipment 170 and/or destination device 175, the relative orientation of surface 185 to access point equipment 170 and/or destination device 175, characteristics of surface 185 (e.g., reflective capability, times when surface is available, limitations on use of surface 185), and whether surface 185 is moving or stationary. One having skill in the relevant art(s), given the description herein, understands additional characteristics that can be stored in surface repository 125 that can affect how surface 185 can provide the different functions described herein, e.g., directing reflected signal 149 to destination device 175. It is also appreciated that storage device 162 is a non-limiting example location for surface repository 125, with other beneficial locations of part or all of this repository being selected based on implementation specific factors, e.g., storage at access point equipment 170 and/or destination device 175.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a system on a chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

In one or more embodiments, computer-executable components 120 can be used in connection with implementing one or more of the systems, devices, components, and/or computer-implemented operations shown and described in connection with FIG. 1 or other figures disclosed herein. For example, in one or more embodiments, computer-executable components 120 can include instructions that, when executed by processor 160, can facilitate performance of operations defining request receiving component 122. As discussed with FIGS. 4-5 below, request receiving component 122 can, in accordance with one or more embodiments, receive a request from access point equipment to establish a communications session between the access point equipment and a user equipment. For example, one or more embodiments of routing controller equipment 150 can receive a request from access point equipment 170 to establish a communications session between the access point equipment and user equipment, e.g., destination device 175.

Further, in another example, in one or more embodiments, computer-executable components 120 can include instructions that, when executed by processor 160, can facilitate performance of operations defining surface tracking component 124. As discussed with FIGS. 3-4 below, surface tracking component 124 can, in accordance with one or more embodiments, identify a reflective surface to facilitate a connection between the user equipment and the access point equipment, resulting in reflected path information corresponding to a reflected path for the communications session. For example, in different implementations, one or more embodiments can identify reflective surface 185 to facilitate a connection between destination device 175 and access point equipment 170, resulting in reflected path information corresponding to a reflected path for the communications session, e.g., indirect signal 148 reflected off of surface 185 resulting in reflected signal 149 to destination device 175.

In yet another example, computer-executable components 120 can include instructions that, when executed by processor 160, can facilitate performance of operations defining path providing component 126. As discussed herein, in one or more embodiments, path providing component 126 can in response to the request, communicate to the access point equipment, the reflected path information. For example, one or more embodiments can in response to the request from access point equipment 170, routing controller can retrieve surface information from surface repository 125, generate the reflected path described above, and provide this reflected path information to access point equipment.

In an example process whereby surface tracking component 124 can use signal propagation principles to select surface 185 from surface repository 125, one or more embodiments can, based on the request from access point equipment 170, identify respective geographic locations of access point equipment 170 (e.g., based on a location reported by the access point equipment with the request, or from network records of access point locations) and the user equipment (e.g., determined by location determining technology of destination device 175, or estimated by access point equipment 170). One having skill in the relevant art(s), given the description herein, appreciates that signal reflection paths can be estimated based on the signal transmission point (e.g., the location of access point equipment 170), the location and orientation of a reflective surface (e.g., surface 185), and the destination of the signal, e.g., destination device 175.

Additional factors that can affect the propagation of signals described by some embodiments herein include, but are not limited to, the transmission strength of the signal, e.g., varying based on factors including the reflective capability of surface 185 and the distances of the elements the reflected signal path. Other factors include the time for the connection (e.g., some surfaces 185) vary in their availability based on different dates and times, and whether the reflective surface 185 that can facilitate the connection is a moving surface. One having skill in the relevant art(s), given the description herein, appreciates that modern processing power can enable the rapid (e.g., changes made in milliseconds) selection and modification of factors including the surfaces selected for reflection, signals to be aimed, transmission strengths to be selected.

Additional approaches to identifying, selecting, and utilizing reflective surfaces that can be used by one or more embodiments are discussed with the descriptions of FIGS. 2-3 below.

Figure 2:
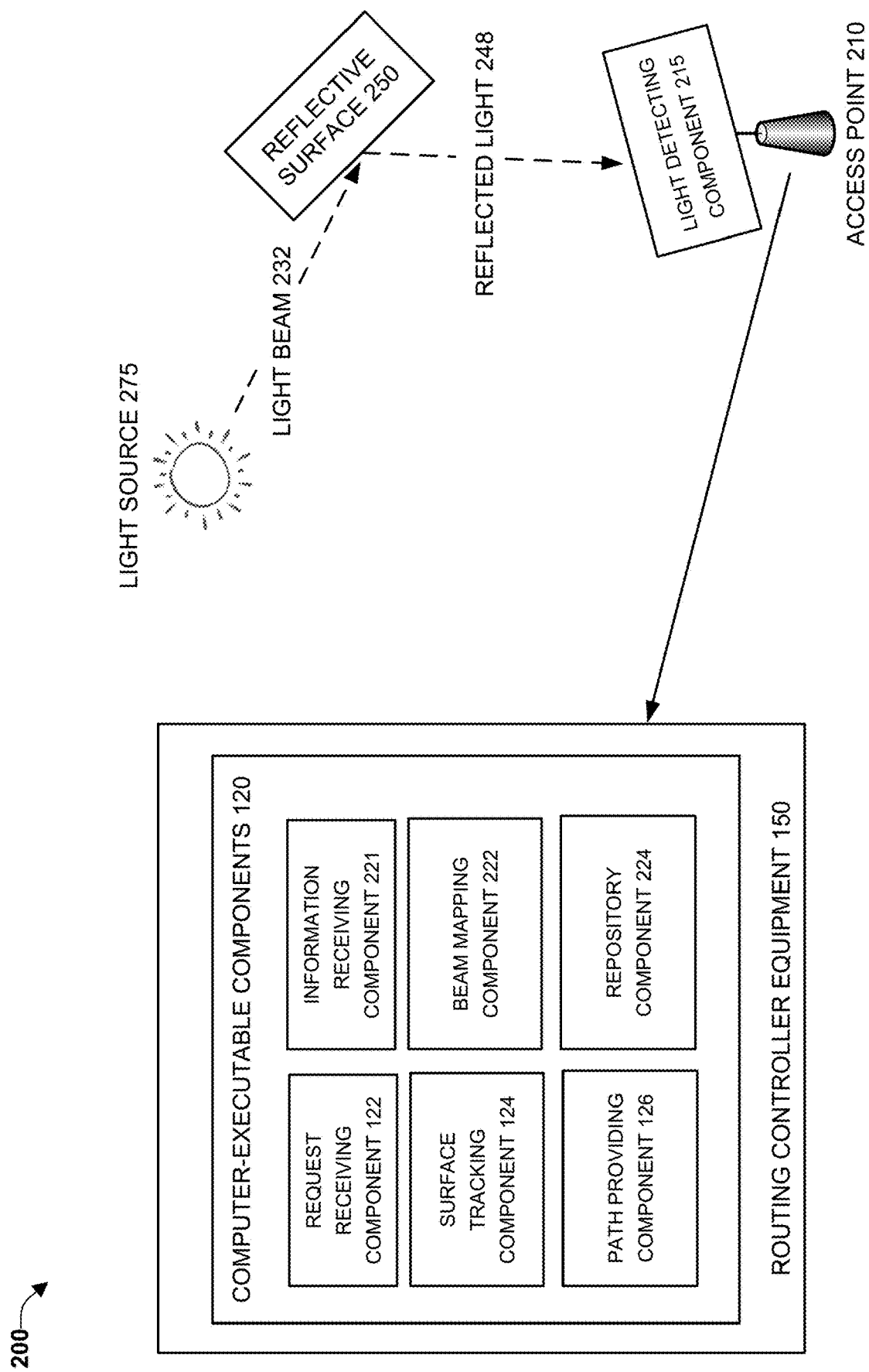
FIG. 2 is a diagram of a non-limiting example system that can facilitate detecting reflective surfaces for use reflecting a signal from access point equipment to destination equipment, in accordance with one or more embodiments.

FIG. 2 is a diagram of a non-limiting example system 200 that can facilitate detecting signal reflecting surfaces by using detected light beams from natural light (e.g., sunlight or moonlight), in accordance with one or more embodiments. For purposes of brevity, description of like elements and/or processes employed in other embodiments is omitted.

As depicted, system 200 shows light detecting component 215 of access point 210 receiving light beam 232 from light source 275 reflected off of reflective surface 250 as reflected light 248. Based on reflected light 248, access point 210 can relay information to routing controller equipment 150, which includes computer-executable components 120. In addition to the components discussed above with FIG. 1, computer-executable components 120 can further include information receiving component 221, beam mapping component 222, repository component 22, and other components described or suggested by different embodiments described herein, that can improve the operation of system 200.

Generally speaking, FIG. 2 depicts, and this section describes, different approaches to generating and updating surface repository 125, e.g., by repository component 224. Even given the approaches described with this drawing to build and maintain a frequently updated surface repository 125 of reflective surface information, it should be noted that one or more embodiments can use different approaches to discover and use reflective surfaces as needed.

In this example, light beam 232 reflects off of reflective surface 250 and is received by access point 210 in the communications network. One having skill in the relevant art(s), given the description herein, appreciates that the known geographic location of access point 210, either an estimated geographic location of light source 275 (e.g., a bright light beamed from a stadium) or, if light source 275 is the sun, a location of the sun in the sky at the date and time the light beam was detected by light detecting component 215, can facilitate the determination or estimation of different characteristics of reflective surface 250, including but not limited to, a direction from which light detecting component 215 received reflected light 248, geographic locations of different elements, reflective orientation of reflective surface 250, and reflective capacity of reflective surface 250. This information can be used to update surface repository 125. Additional details about example operation of computer-executable component 120 are discussed below.

In an example, computer-executable components 120 can include instructions that, when executed by processor 160, can facilitate performance of operations defining information receiving component 221. As discussed herein, in one or more embodiments, path information receiving component 221 can receive from access point equipment, characteristic data representative of a characteristic of a beam of reflected light reflected by a reflective surface and detected by the access point equipment. For example, after the information describing reflective surface 250 is collected by access point 210, routing controller equipment 150 can receive the information via information receiving component 221, e.g., this information including one or more of the position of the light source, the estimated or known position of reflective surface 250, the location of the receiving component, and other characteristics.

In another example, computer-executable components 120 can include instructions that, when executed by processor 160, can facilitate performance of operations defining beam mapping component 222 As discussed herein, in one or more embodiments, path information beam mapping component 222 can, based on the characteristic and a first geographic location of the access point equipment, map a second geographic location of the reflective surface. For example, based on a direction indication and a destination location of the signal (e.g., the geographic location of access point 210), beam mapping component 222 can map a geographic location of reflective surface 250, and this information can be stored (e.g., by repository component 224) in surface repository 125. In another example, a characteristic of the beam of reflected light can be an intensity of the beam of reflected light 248, measured when the beam was detected, e.g., by light detecting component 215. Based on this intensity, a transmission strength for a signal that would use the reflected path can be estimated.

In an implementation example discussed with FIGS. 4-6 below, beam mapping component 222 can be implemented as a part of a radio access network intelligent component (RANIC), in a larger RAT network system.

Figure 3:
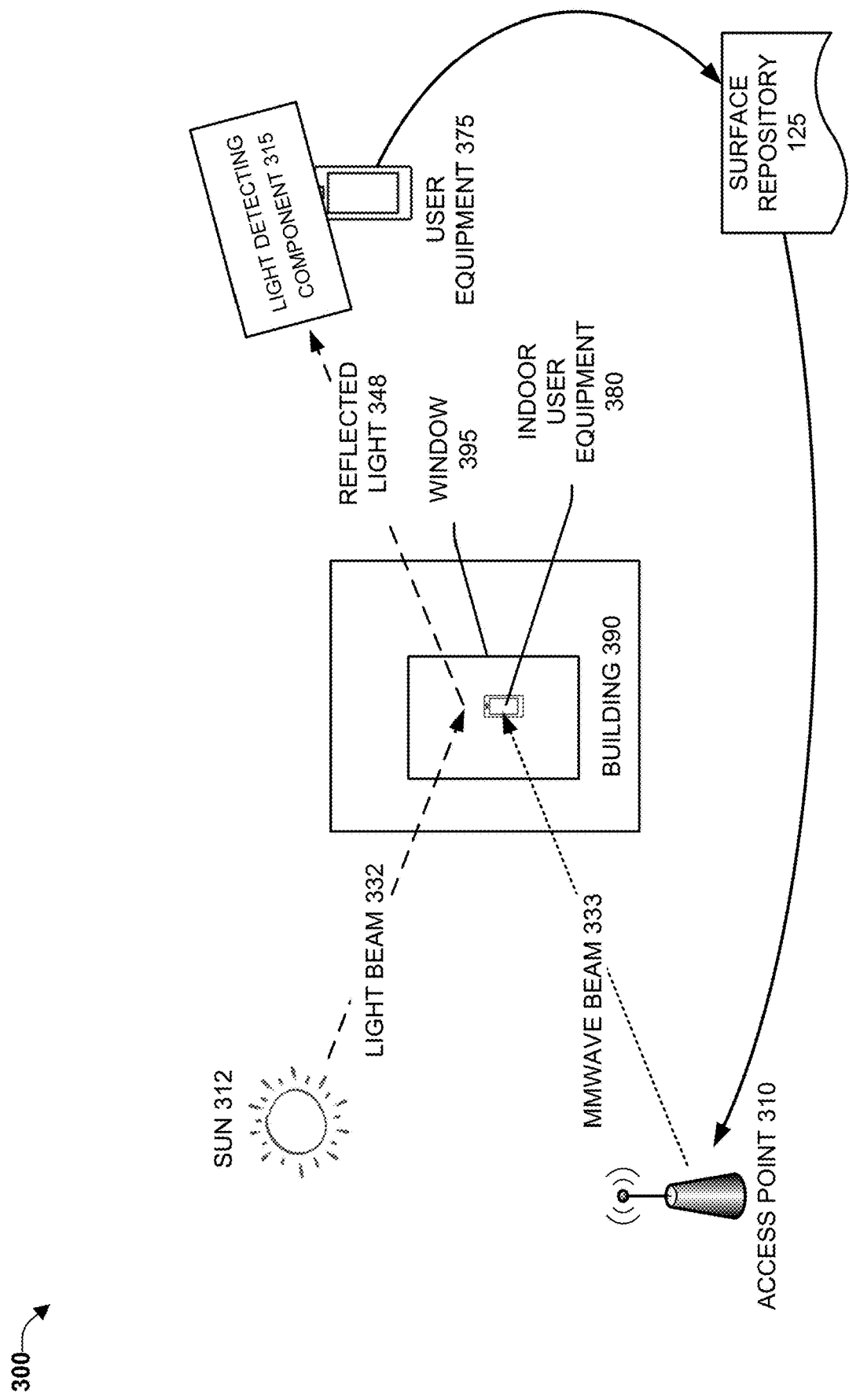
FIG. 3 is a diagram of a non-limiting example system that can facilitate detecting reflective surfaces for use finding paths from access point equipment to destination equipment, in accordance with one or more embodiments.

FIG. 3 is a diagram of a non-limiting example system 300 that can facilitate detecting reflective surfaces for use finding paths from access point equipment to destination equipment, in accordance with one or more embodiments. For purposes of brevity, description of like elements and/or processes employed in other embodiments is omitted. FIG. 3 depicts indoor user equipment 380 inside building 390 with window 395. As depicted in FIG. 3, light beam 332 of sun 312 can be detected by light detecting component 315 of user equipment 375 as reflected light 348 off of window 395. User equipment 375 can gather information described below about window 395, and store the information in surface repository 125 for use by access point 310.

In this example, window 395 represents a reflective surface that can temporarily allow access by communication signals (e.g., mmWave 333) to potentially hard to reach areas (e.g., building 390) for communication with destination devices (e.g., indoor user equipment 380). As such, example window 395 is a window can cause reflectivity in a space that can occasionally not be reflective, e.g., window 395 can be open and thus the space it covers is not reflective at that time. One having skill in the relevant art(s), given the description herein, appreciates that other potentially hard for signals to reach areas can have similar conditions, e.g., a bus shelter can be temporarily obscured by a movable reflective surface (e.g., a bus), and a train door can temporarily reflect or allow passage of similar signals.

As noted with FIG. 2 above, one or more embodiments can use signal/beam generating devices to detect reflective surfaces, with information about the characteristics of these surfaces being stored in surface repository 125 for use with different functions, e.g., reflecting communication signals to reach destination devices by alternative paths. In the example illustrated with system 300, the reflective surface (e.g., closed window 395) can be detected, e.g., by light detecting component 315 of user equipment 375, stored in surface repository 125, and provided to access point 310 for use reflecting a signal to a destination device, e.g., as shown in FIG. 1.

As discussed with FIG. 2 above, surface repository 125 can be a reference that is updated based on changing conditions, e.g., some locations that are detected as reflective can at different times be non-reflective, e.g., a moving car on a road, or a metal trash can placed at a curb. One or more embodiments, by testing different locations over time, can systematically determine conditions where a reflective surface is available for reflections, e.g., during a time of heavier road traffic a vehicle will likely be at a location or on a day where trash is collected the reflective trash can may be placed in a particular area.

With the example of FIG. 3, one or more embodiments can detect times of non-reflectivity and, over time, determine that this non-reflectivity can be indicative of signal access to areas that are not otherwise accessible, or access by supplementary signals based on a different path than other signals, e.g., indirect signal 148 of FIG. 1. In the FIG. 3 example, window 395 has been detected as occasionally allowing access to the inside of building 390 to indoor user equipment 380. Thus, when indoor user equipment 380 initiates a communication session (e.g., based on communication signals that can access building 390), one or more embodiments can direct a communication signal (e.g., mmWave 333) at window 395 for a chance at a beneficial high-bandwidth connection to indoor user equipment 380. One having skill in the relevant art(s), given the description herein, understands that the reflected light of sun 312 example shown in FIG. 3 to detect window 395 is only one example of how temporarily obscuring surfaces can be detected, and approaches to accessing hard to reach areas discussed above can be used with other ways of detecting periodic openings, e.g., pictures of an area can be used to detect opening windows and doors with similar effect.

Returning to the example of FIG. 3, computer-executable components 120 can further include instructions that, when executed by processor 160, can cause beam mapping component 222 to determine that window 395 of building 390 is open to expose an opening into the structure, and based on the opening and an indication that indoor user equipment 380 is inside the structure, path providing component 124 can provide access point 310 a route through window 395 for mmWave 333 to access the user device.

Figure 4:
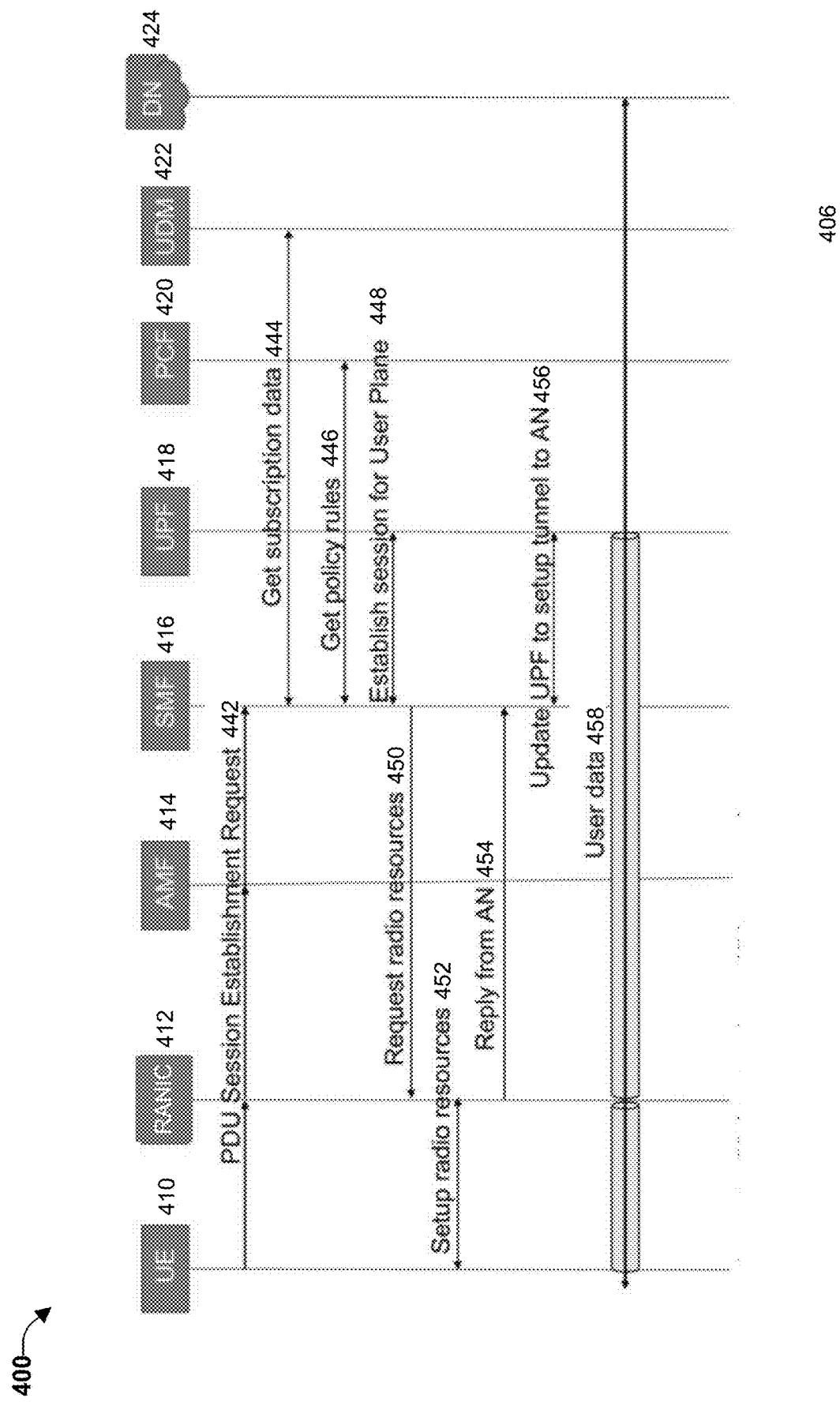
FIG. 4 depicts an example signal diagram that illustrates a process whereby a reflective surface can reflect a signal from access point equipment to signal receiving equipment, in accordance with one or more embodiments.
Figure 5:
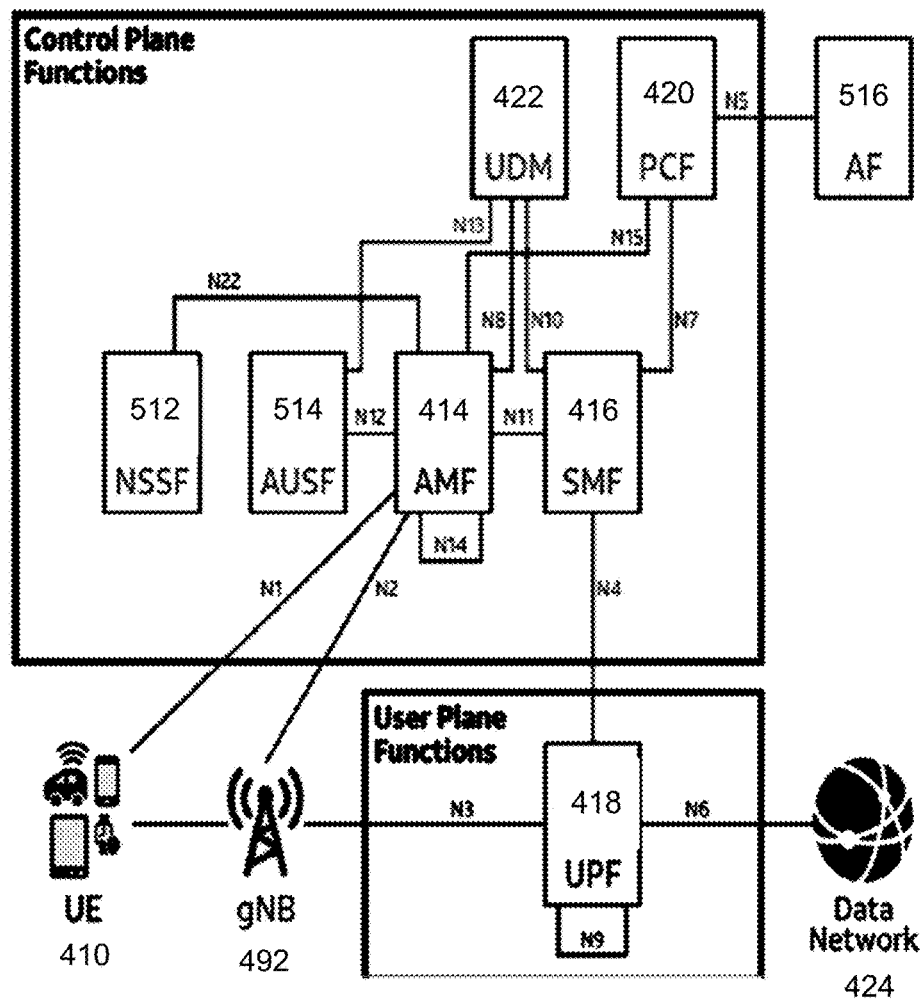
FIG. 5 depicts a non-limiting example architecture diagram of a system that can reflect a signal from access point equipment to signal receiving equipment, in accordance with one or more embodiments.
Figure 6:
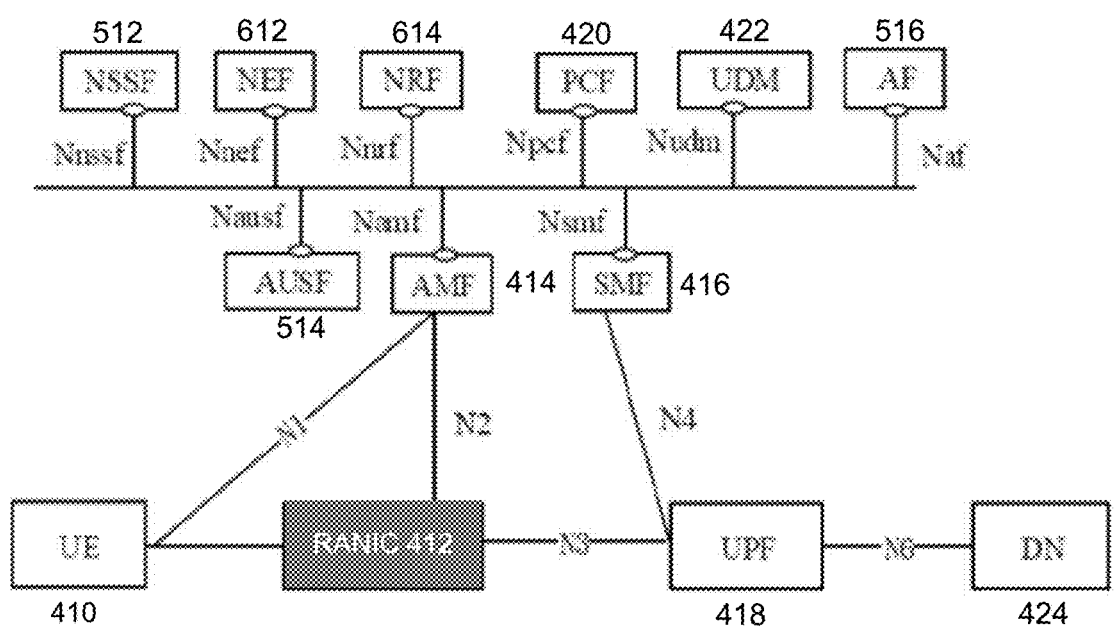
FIG. 6 depicts a non-limiting example architecture diagram of a system that can reflect a signal from access point equipment to signal receiving equipment, in accordance with one or more embodiments.

FIGS. 4, 5, and 6 respectively depict an example signal diagram 400, and architecture diagrams 500 and 600 that can facilitate detecting reflective surfaces for use reflecting a signal from access point equipment to destination equipment, in accordance with one or more embodiments. For purposes of brevity, description of like elements and/or processes employed in other embodiments is omitted. Signal diagram 400 illustrates a non-limiting example sequence of events that illustrates how existing 5G core virtual network functions (VNFs) and elements of the RAN (e.g., gNBs) can be configured to facilitate handshaking for scanning expanded coverage areas enabled by reflective surfaces.

Illustrative components of signal diagram 400 include UE 410, radio access network intelligent controller (RANIC) 412, access management function (AMF) 414, session management function (SMF) 416, user plane function (UPF) 418, policy control function (PCF) 420, unified data management (UDM) 422, and data network (DN) 424. Non-limiting architecture diagram 500 of FIG. 5 includes some of the above noted components of FIG. 4, as well as network slice selection function (NSSF) 512, authentication server function (AUSF) 514, gNB 592, and application function (AF) 516. Non-limiting architecture diagram 600 of FIG. 6 includes some of the above noted components of FIGS. 4 and 5, as well as network exposure function (NEF) 612, and network repository function (NRF) 614.

At 442, a protocol data unit (PDU) session establishment request is communicated from UE 410 to SMF 416 via AN 412 and AMF 414. At 444, a get subscription data message is relayed from SMF 416 to UDM 422, via UPF 418 and PCF 420. At 446, a get policy rules message is communicated from SMF 416 to PCF 420, via UPF 418. At 448, SMF 416 establishes with UPF 418, a session for the user plane.

At 450, based on a priority for the communication to UE 410, SMF 416 can request radio resources from RANIC 412 via AMF 414, e.g., additional resources can be dedicated for RANIC 412 to locate useful reflective surfaces for the connection. In one or more embodiments, resources allocated to RANIC 412 can be adjusted based on different system requirements, e.g., additional resources can be allocated to increase the frequency with which discoveries of useful reflective surfaces occur. One having skill in the relevant art(s), given the description herein appreciates different types of applications that can require improved performance, e.g., applications with holographic communications, e-gaming, tele-health applications for live diagnostics, etc.

At 452, radio resources can be setup by communication between UE 410 and RANIC 412. At 454, RANIC 412 responds to the 450 request, e.g., an example response being a notification to core network resources regarding reflective surfaces are identified and can be potentially can be used during the call, even in a situation where UE 410 and/or reflective surface 250 are mobile. At 456, SMF 416 updates UPF 418 to setup a tunnel to RANIC 412. At 458, a user session can be established between UE 410 and UPF 418 via AN 412, AMF 414, SMF 416, and UPF 418.

In an example implementation, a user application can be installed on UE 410 to monitor the applications of UE 410 and, based on the workload and QoS and reliability requirements, the user application can notify a backend server to use UPF 418 to command RANIC 412 to dedicate additional system resources to finding reflective surfaces for better signal coverage. In a variation of this example, the user application can also monitor the communications of UE 410 for excessive packet loss or delay and can trigger the above noted resource allocations based on these conditions.

In one or more embodiments, preemptive activity can be performed to facilitate potentially required supplementation of communications signals by reflective signal bandwidth, e.g., utilizing a reachability management module of AMF 414 to track the position of UE 410 in relation to known and potentially useful reflective surfaces if UE 410 requires additional resources. Based on this tracking, AMF 414 can provide additional feedback to RANIC 412 regarding locations where resources available for the supplementation of surface repository 125 can be utilized. Further to this end, in one or more embodiments, a security context management module of AMF 414 can conserve RANIC 412 resources by authenticating the service level allocated to UE 410, e.g., whether UE 410 has a higher priority designation, such as for public safety customers.

Figure 7:
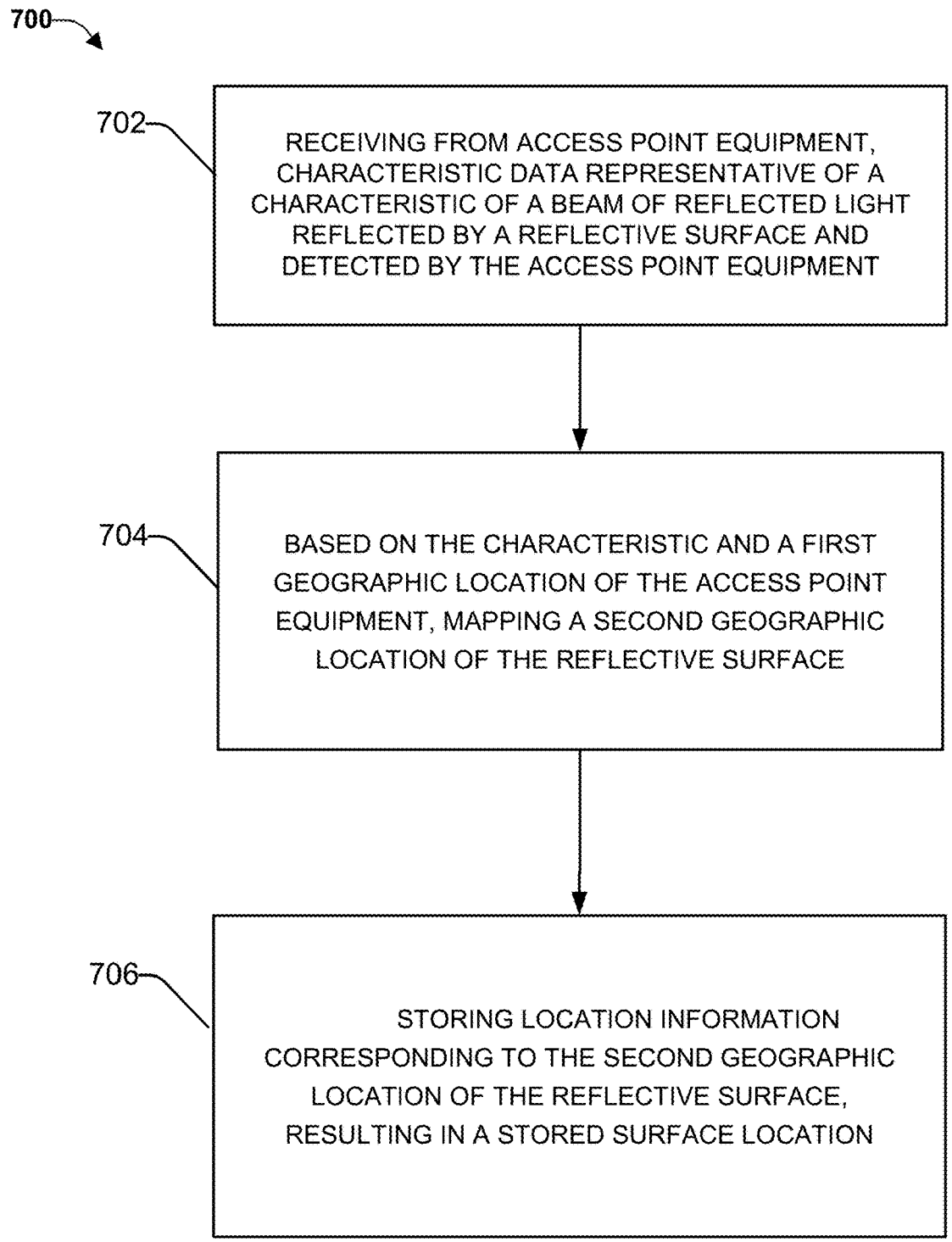
FIG. 7 illustrates an example method that can facilitate detecting reflective surfaces for use reflecting a signal from access point equipment to destination equipment, in accordance with one or more embodiments.

FIG. 7 illustrates an example method 700 that can facilitate detecting reflective surfaces for use reflecting a signal from access point equipment to destination equipment, in accordance with one or more embodiments. For purposes of brevity, description of like elements and/or processes employed in other embodiments is omitted.

At 702, method 700 can include receiving from access point 210, characteristic data representative of a characteristic of a beam of reflected light 248 reflected by a reflective surface 250 and detected by the access point 210. At 704, method 700 can include, based on the characteristic and a first geographic location of the access point 210, mapping a second geographic location of the reflective surface 250. At 706, method 700 can include, storing location information corresponding to the second geographic location of reflective surface 250, resulting in a stored surface location stored in surface repository 125.

Figure 8:
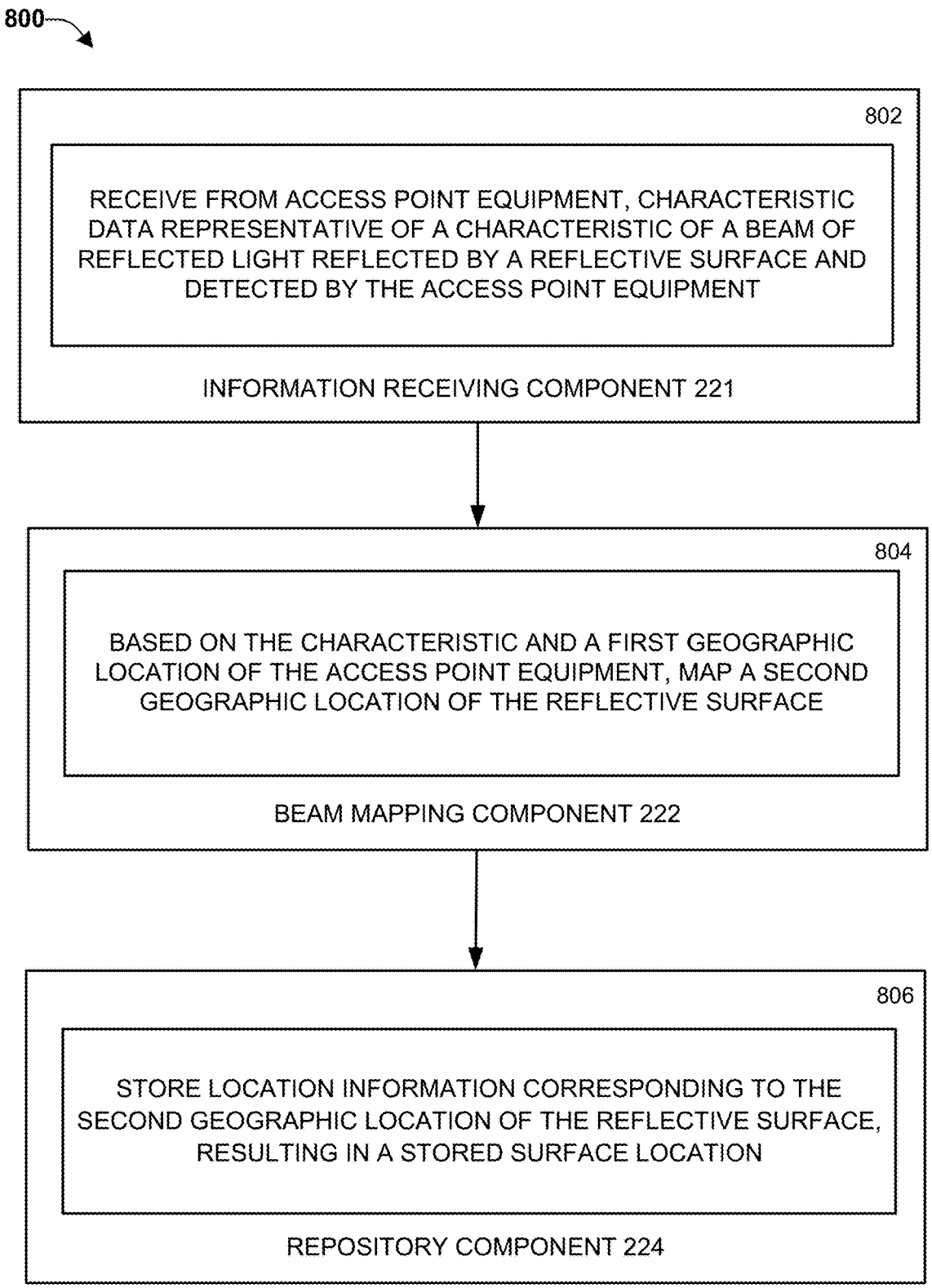
FIG. 8 depicts a system that can facilitate detecting reflective surfaces for use reflecting a signal from access point equipment to destination equipment, in accordance with one or more embodiments.

FIG. 8 depicts a system 800 that can facilitate detecting reflective surfaces for use reflecting a signal from access point equipment to destination equipment, in accordance with one or more embodiments. For purposes of brevity, description of like elements and/or processes employed in other embodiments is omitted. As depicted, system 800 can include information receiving component 221, beam mapping component 222, repository component 224, and other components described or suggested by different embodiments described herein, that can improve the operation of system 800.

In a non-limiting example, component 802 can include the functions of information receiving component 221, supported by the other layers of system 800. For example, component 802 can receive from access point 210, characteristic data representative of a characteristic of a beam of reflected light 248 reflected by a reflective surface 250 and detected by the access point 210. In this and other examples, component 804 can include the functions of beam mapping component 222, supported by the other layers of system 800. Continuing this example, in one or more embodiments, component 804 can, based on the characteristic and a first geographic location of the access point 210, map a second geographic location of the reflective surface 250. Continuing this example, component 806 can include the functions of repository component 224, supported by the other layers of system 800. For example, component 806 can store location information corresponding to the second geographic location of reflective surface 250, resulting in a stored surface location stored in surface repository 125.

Figure 9:
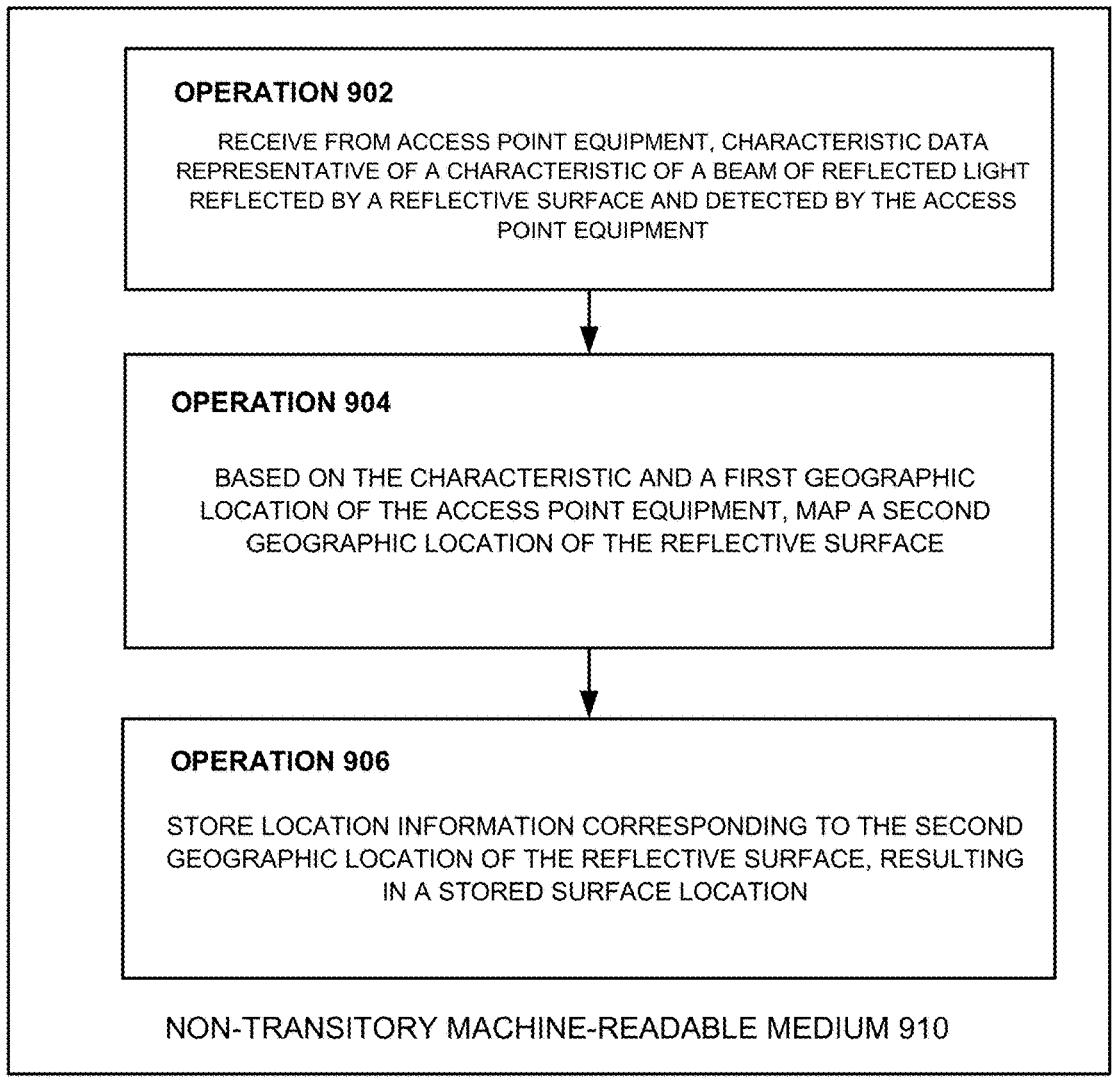
FIG. 9 depicts an example non-transitory machine-readable medium that can include executable instructions that, when executed by a processor of a system, facilitate detecting reflective surfaces for use reflecting a signal from access point equipment to destination equipment, in accordance with one or more embodiments described above.

FIG. 9 depicts an example 900 non-transitory machine-readable medium 910 that can include executable instructions that, when executed by a processor of a system, facilitate detecting reflective surfaces for use reflecting a signal from access point equipment to destination equipment, in accordance with one or more embodiments described above. For purposes of brevity, description of like elements and/or processes employed in other embodiments is omitted. As depicted, non-transitory machine-readable medium 910 includes executable instructions that can facilitate performance of operations 902-906.

In one or more embodiments, the operations can include operation 902 that can receive from access point equipment, characteristic data representative of a characteristic of a beam of reflected light reflected by a reflective surface and detected by the access point equipment. Operations can further include operation 904, that can, based on the characteristic and a first geographic location of the access point equipment, map a second geographic location of the reflective surface. In one or more embodiments, the operations can further include operation 906 that can, in one or more embodiments, store location information corresponding to the second geographic location of the reflective surface, resulting in a stored surface location.

Figure 10:
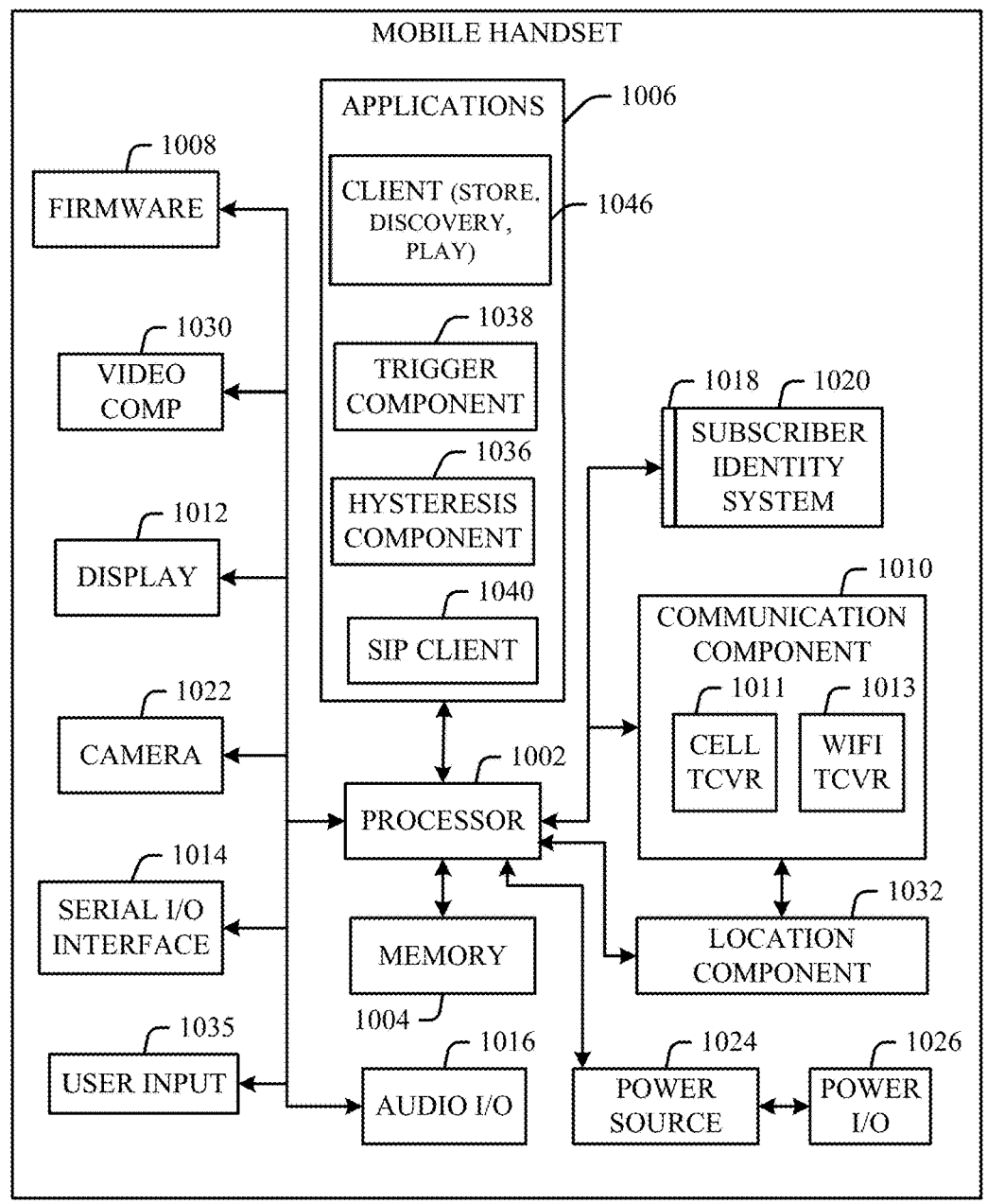
FIG. 10 illustrates an example block diagram of an example mobile handset operable to engage in a system architecture that can facilitate processes described herein, in accordance with one or more embodiments.

FIG. 10 illustrates an example block diagram of an example mobile handset 1000 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1294) through a hardwire connection, and other serial input devices (e.g., a keyboard, keypad, and mouse). This supports updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card SIM or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communications component 1010 to accommodate IP traffic from an IP network such as, for example, the Internet, a corporate intranet, a home network, a person area network, etc., through an ISP or broadband cable provider. Thus, VoIP traffic can be utilized by the handset 1000 and IP-based multimedia content can be received in either an encoded or a decoded format.

A video processing component 1022 (e.g., a camera) can be provided for decoding encoded multimedia content. The video processing component 1022 can aid in facilitating the generation, editing, and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touch screen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1036 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 1010, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Network 190 can employ various cellular systems, technologies, and modulation schemes to facilitate wireless radio communications between devices. While example embodiments include use of 5G NR systems, one or more embodiments discussed herein can be applicable to any RAT or multi-RAT system, including where user equipment operate using multiple carriers, e.g., LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

Various embodiments described herein can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 11:
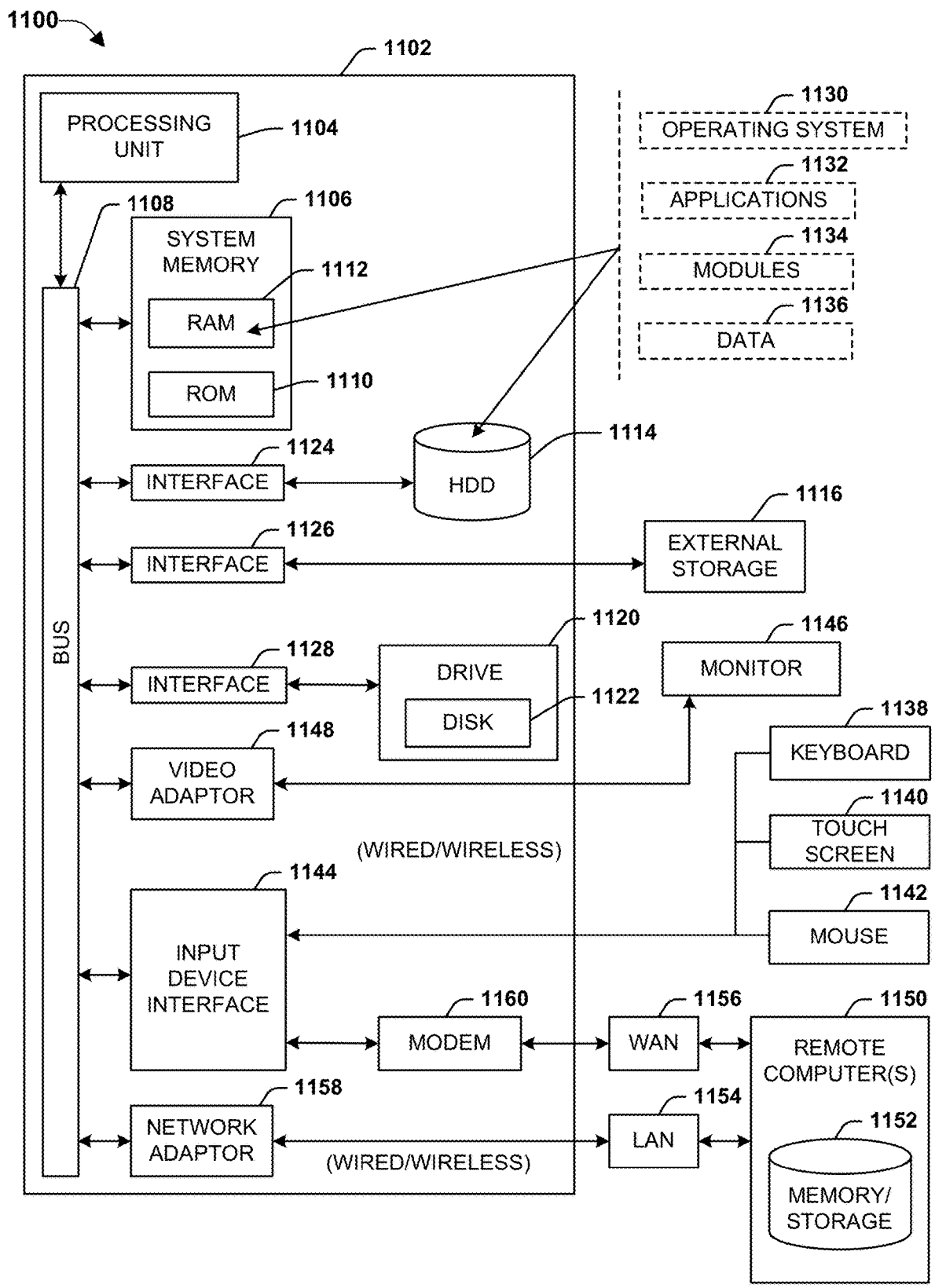
FIG. 11 illustrates an example block diagram of an example computer operable to engage in a system architecture that can facilitate processes described herein, in accordance with one or more embodiments.

FIG. 11 provides additional context for various embodiments described herein, intended to provide a brief, general description of a suitable operating environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example operating environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and a drive 1120, e.g., such as a solid-state drive, an optical disk drive, which can read or write from a disk 1122, such as a CD-ROM disc, a DVD, a BD, etc. Alternatively, where a solid-state drive is involved, disk 1122 would not be included, unless separate. While the internal HDD 1114 is illustrated as located within the computer 1102, the internal HDD 1114 can also be configured for external use in a suitable chassis (not shown). Additionally, while not shown in environment 1100, a solid-state drive (SSD) could be used in addition to, or in place of, an HDD 1114. The HDD 1114, external storage device(s) 1116 and drive 1120 can be connected to the system bus 1108 by an HDD interface 1124, an external storage interface 1126 and a drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above, such as but not limited to a network virtual machine providing one or more aspects of storage or processing of information. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further to the description above, as it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine-readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment do not normally connect directly to the core networks of a large service provider, but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the embodiments are not to be limited to any single implementation, but rather are to be construed in breadth, spirit and scope in accordance with the appended claims.

What is claimed is:

1. A method, comprising:
   receiving, by routing controller equipment comprising a processor, from access point equipment, characteristic data representative of a characteristic of a beam of reflected light reflected by a reflective surface and detected by the access point equipment;
   based on the characteristic and a first geographic location of the access point equipment, mapping, by the routing controller equipment, a second geographic location of the reflective surface; and
   storing, by the routing controller equipment, location information corresponding to the second geographic location of the reflective surface, resulting in a stored surface location.

2. The method of claim 1, wherein the characteristic of the beam of reflected light is detected by a camera.

3. The method of claim 1, wherein the beam of reflected light comprises a source of artificial light originating from a third geographic location, and wherein mapping the second geographic location is further based on the third geographic location.

4. The method of claim 1, wherein the beam of reflected light comprises a beam of sunlight, and wherein mapping the second geographic location is further based on a sun position corresponding to when the beam was detected.

5. The method of claim 1, further comprising:
   receiving, by the routing controller equipment, a request from the access point equipment to establish a communications session between the access point equipment and a user equipment;
   identifying, by the routing controller equipment, the stored surface location to facilitate a connection between the user equipment and the access point equipment, resulting in reflected path information corresponding to a reflected path for the communications session; and in response to the request, communicating, by the routing controller equipment, to the access point equipment, the reflected path information.

6. The method of claim 5, wherein the characteristic of the beam of reflected light comprises an intensity of the beam corresponding to when the beam was detected.

7. The method of claim 6, wherein the reflected path information comprises a transmission strength for a signal that uses the reflected path, and wherein the transmission strength was determined based on the intensity of the beam.

8. The method of claim 5, wherein identifying the stored surface location is based on a third geographic location of the user equipment.

9. The method of claim 8, wherein the third geographic location was determined by the user equipment based on a location determining technology of the user equipment.

10. The method of claim 1, wherein the stored surface location was identified from a group of surface locations usable by the access point equipment to reflect signals to destination equipment.

11. The method of claim 1, wherein the characteristic comprises a description of the reflective surface, and wherein the method further comprises, based on the second geographic location, determining, by the routing controller equipment, the description of the reflective surface.

12. The method of claim 11, wherein the description of the reflective surface comprises a description of a window of a structure.

13. The method of claim 12, further comprising:
determining, by the routing controller equipment, that the window of the structure is open to expose an opening into the structure; and
based on the opening being exposed and an indication that a user equipment is inside the structure, facilitating, by the routing controller equipment, routing a directed beam for communications to the user equipment via the opening.

14. A non-transitory machine-readable medium, comprising executable instructions that, when executed by a processor of routing controller equipment, facilitate performance of operations, comprising:
receiving beam information corresponding to a beam of light reflected by a reflective surface and detected by a camera at a first geographic location;
based on the received beam information, an estimated second location of a source of the beam, and the first geographic location, determining a third geographic location corresponding to the reflective surface; and
based on a request to route a signal from a fourth location to a fifth location, communicating the third geographic location to an issuer of the request including signal source equipment at the fourth location.

15. The non-transitory machine-readable medium of claim 14, wherein the operations further comprise, based on the request to route, routing the signal to a user equipment at the fifth location.

16. The non-transitory machine-readable medium of claim 15, wherein:
the beam information corresponds to a strength of the beam when the beam was received, and the strength of the beam is provided to facilitate selection of a transmission power for the signal by the signal source equipment.

17. A routing controller equipment, comprising:
a processor; and
a memory that stores executable instructions that, when executed by the processor, facilitate performance of operations, comprising:
receiving an attribute of a beam of sunlight received from access point equipment;
based on a first geographic location of the access point equipment and a determined sky location of a sun at a time at which the beam was detected by the access point equipment, determining that the beam was reflected from a reflective surface at a second geographic location; and
communicating the attribute and the second geographic location to a reflective surface repository for storage, resulting in stored reflective surface information.

18. The routing controller equipment of claim 17, wherein the attribute comprises a description of the reflective surface, wherein the operations further comprise, based on the second geographic location, determining the description of the reflective surface, and wherein the stored reflective surface information further comprises the description.

19. The routing controller equipment of claim 18, wherein the attribute comprises an intensity of the beam when the beam was detected by the access point equipment, and wherein determining the description of the reflective surface is further based on the intensity of the beam.

20. The routing controller equipment of claim 17, wherein the operations further comprise:
receiving a request from the access point equipment to establish a communications session between the access point equipment and a user equipment; and
identifying the second geographic location to facilitate a connection between user equipment and the access point equipment, resulting in reflected path information corresponding to a reflected path for the communications session.

* * * * *